United States Patent [19]

Wagner

[11] Patent Number: 4,913,315

[45] Date of Patent: Apr. 3, 1990

[54] DISPENSING APPARATUS FOR DISPENSING PIECES OF ICE, OR THE LIKE

[75] Inventor: Malcolm I. Wagner, Middleton, England

[73] Assignee: 501 ICE Optic Limited, Burnage, England

[21] Appl. No.: 275,690

[22] Filed: Nov. 23, 1988

Related U.S. Application Data

[63] Continuation of Ser. No. 22,780, Mar. 6, 1987, abandoned.

[30] Foreign Application Priority Data

Mar. 15, 1986 [GB] United Kingdom ................. 8606427

[51] Int. Cl.[4] ............................................. G01F 11/18

[52] U.S. Cl. .................................... 221/200; 222/254; 222/246; 222/269; 222/245; 222/108

[58] Field of Search ..................... 222/146.6, 108, 245; 141/360, 362, 355; 221/192, 191, 200, 202, 204–205, 246, 254, 263, 264, 269

[56] References Cited

U.S. PATENT DOCUMENTS

| | | | |
|---|---|---|---|
| 1,861,834 | 6/1932 | Binggeli | 221/205 |
| 1,916,974 | 7/1933 | Fuller et al. | 221/192 |
| 2,244,581 | 6/1941 | Tardette | 221/192 |
| 2,429,510 | 10/1947 | Callison | 221/205 X |
| 2,447,054 | 8/1948 | Coates | 221/264 |
| 3,021,035 | 2/1962 | Hill | 222/108 X |
| 3,276,224 | 10/1966 | Lunde | 62/344 |
| 3,913,343 | 10/1975 | Rowland et al. | 62/344 |
| 4,679,715 | 7/1987 | Hovinga | 222/146.6 X |

FOREIGN PATENT DOCUMENTS

| | | | |
|---|---|---|---|
| 139343 | 12/1948 | Australia | 221/192 |
| 794911 | 2/1936 | France | 221/205 |

*Primary Examiner*—H. Grant Skaggs

*Attorney, Agent, or Firm*—Harry M. Weiss

[57] ABSTRACT

An ice dispenser comprising a housing for receipt of a plurality of pieces of ice, an outlet from the dispenser and a dispensing structure movable between a first location wherein the structure communicates with the housing and a second location wherein the structure communicates with the outlet, wherein movement of the dispensing structure from the first location to the second location causes a piece of ice received in the housing to be dispensed from the outlet.

9 Claims, 4 Drawing Sheets

FIG. 1
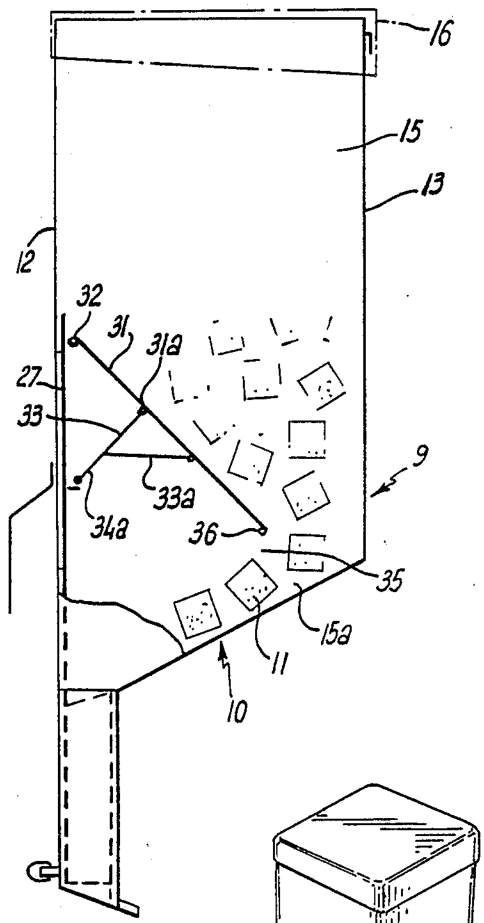
FIG. 2
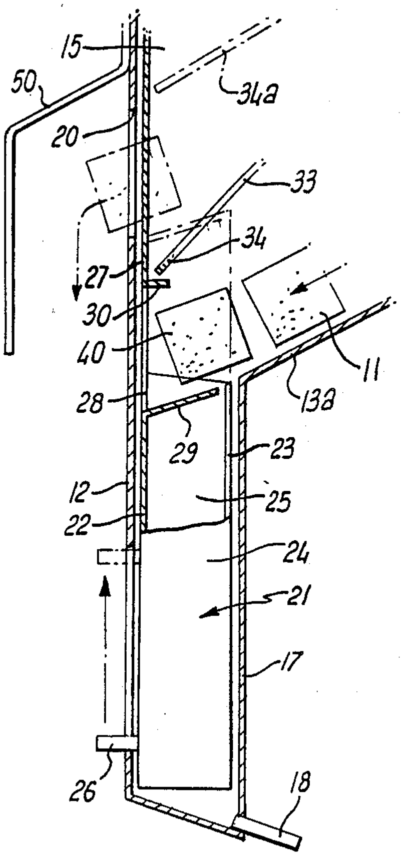
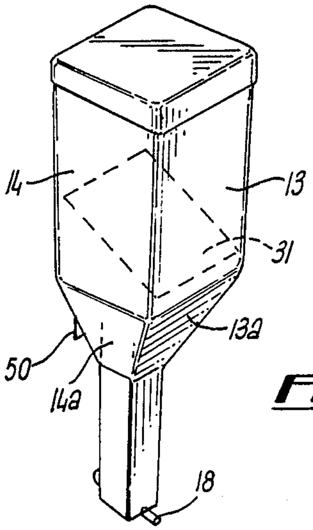
FIG. 3

FIG. 6
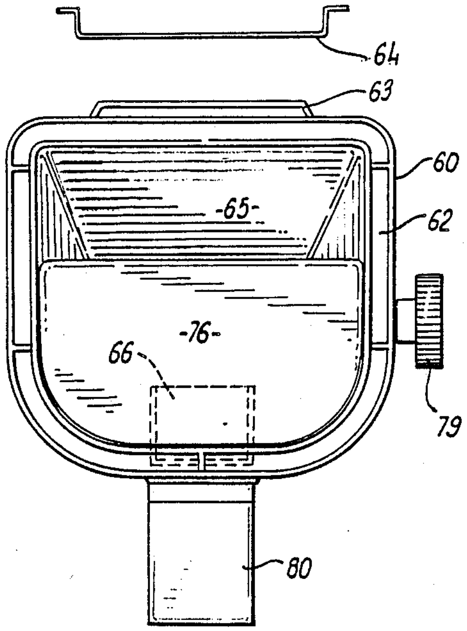
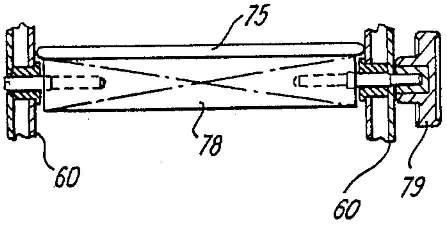
FIG. 7

DISPENSING APPARATUS FOR DISPENSING PIECES OF ICE, OR THE LIKE

This is a continuation of co-pending application Ser. No. 022,780 filed on Mar. 6, 1987, and now abandoned.

This invention relates to a dispenser, particularly but not exclusively for dispensing pieces of ice. Pieces of other materials may also be individually dispensed.

According to the present invention a dispenser comprises a housing for receipt of a plurality of pieces of ice, an outlet from the dispenser and a dispensing structure movable between a first location wherein said structure communicates with the housing and a second location wherein said structure communicates with the outlet wherein movement of the dispensing structure from the first location to the second location causes a piece of ice received in the housing to be dispensed from the outlet.

In preferred embodiments of the invention the first location is lower than the second location, the dispensing structure being movable vertically between the first and second locations. In alternative embodiments of the invention the dispensing structure is movable horizontally or in an inclined direction between said locations.

Agitating means may be provided to agitate pieces of ice in the housing, the agitating means being operable on a divider arranged to prevent discharge of pieces of ice directly from the housing through the outlet, bypassing the dispensing structure. The baffle also serves to support pieces of ice and to provide a gap with the housing so that single pieces or layers of pieces of ice pass sequentially to the dispensing structure.

The divider may be pivoted and preferably comprises a pivoted flap.

The divider or baffle may be arranged to be agitated by a manually actuated member located on the exterior of the housing. Alternatively the divider or baffle may be agitated automatically as a piece of ice is dispensed.

The dispensing means may be arranged on upward movement to engage the divider to impart movement thereto and thus to pieces of ice supported by the divider.

The dispensing structure may include a portion such as a platform for engaging and lifting a piece of ice to be dispensed, the portion forming a continuation of a lower portion of the housing wall. Said lower portion may be inclined so that pieces of ice passing the divider slide onto the platform of the dispensing structure.

The housing may include a drainage chute within which said structure is guided and movable between the first and second locations.

The invention will now be described further, by way of example only with reference to the accompanying drawings, in which:

FIG. 1 is a diagrammatic side elevation, partly broken away, of a first form of dispenser;

FIG. 2 is a vertical section, drawn to a larger scale of a part of the dispenser shown in FIG. 1;

FIG. 3 is a perspective view, drawn to a reduced scale, of the dispenser shown in FIGS. 1 and 2.

FIG. 6 is a plan view of the dispenser shown in FIG. 4 with the lid removed; and FIG. 7 is a section on line A—A of FIG. 4.

Figure 4:
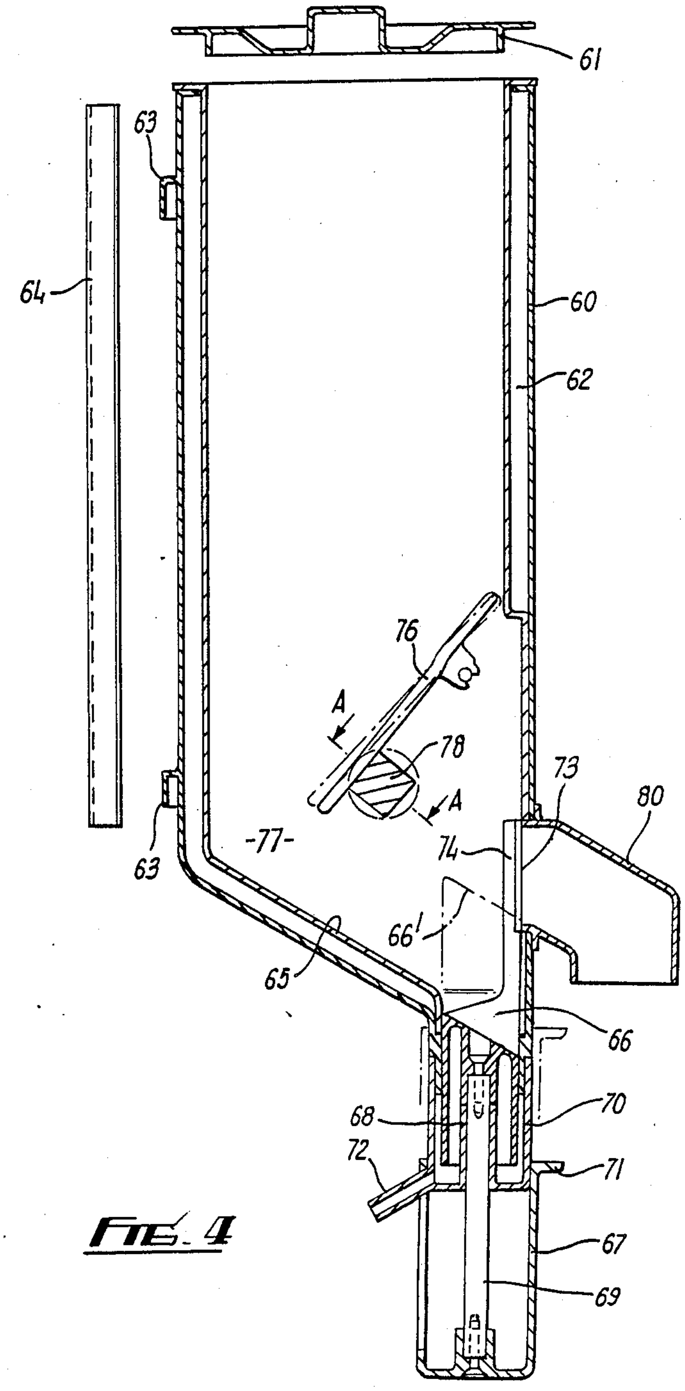
FIG 4 is a vertical section through a second embodiment of the invention.

Referring now to the drawings, and particularly to FIGS. 1 to 3 thereof, a dispenser 10 for use in dispensing pieces 11 of ice, comprises a hollow open-topped housing 9 with front and rear walls 12, 13 side walls 14, 15, and a removable lid 16. The walls 13,14,15 have inwardly inclined lower portions 13*a*,14*a*,15*a* respectively which lead to the top of adrain chute 17 which terminates, at its lower end in a drainage outlet 18 at its lower end.

An opening 20 is provided in front wall 12 in alignment with and above the chute 17. A delivery or dispensing structure 21 is mounted in the chute 17 for up and down sliding movement therein, delivery structure 21 having front and rear walls 22,23 and side walls 24,25 close to the respective walls of the chute 17. An operating knob 26 extends outwardly from structure 21 to engage an upright slot provided in wall 12 below and in alignment with the outlet 20, structure 21 being movable axially of the chute by sliding movement of the knob in the said slot. The front wall 22 of the delivery structure 21 is extended upwardly at 27, an aperture 28 of generally similar shape to the opening 20 being provided in the extended portion 27. A ledge 29 extends inwardly and upwardly of the chute from the lower edge of aperture 28, said ledge, in the down position of the structure, forming a continuation of the wall 13*a* as shown in full line in FIG. 2. The upper edge of the aperture 28 has an inward lip 30.

A flat flap 31 is pivotally supported within the housing 9 on a cross bar 32, the upper end of wall 27 on the delivery structure 21 being slidably guided between the wall 12 and the bar 32 (FIG. 1).

At its underside flap 31 pivotally supports a bifurcated element 33 having a forward edge 34 which rests on the lip 30 and an arm 33*a* which can engage flap 31 beneath hinge 31*a*.

On loading the dispenser, the pieces of ice are supported in the housing on the flap 31 and some pass through the gap 35 between the free edge 36 of the flap and the rear wall 13. As the sides of the flap lie close to side walls 14, 15, the pieces of ice pass essentially as a single layer past edge 36.

When it is desired to dispense a piece of ice, the knob 26 and thus the delivery structure 21, is moved upwards to that the leading piece of ice 40, which piece is supported by the ledge 29 is lifted to a position adjacent the opening 20, to be dispensed through aligned openings 28, 20 under gravity.

Upward movement of delivery structure 21 lifts element 33 and causes the flap to pivot, thereby disturbing the mass of ice above the flap and hence reduce the possibility of jamming of ice pieces in the gap 35.

The extent to which the flap is pivotted is variable according to the rest position of the edge 34 of element 33. As shown dotted at 34*a*, this can be at the level of the top of opening 20 for a reduced pivotting of the flap. Birfurcated element 33 may of course take other forms.

Only one hand is needed to dispense the ice, leaving the other hand free to hold a glass or other container to receive the ice dispensed through the opening 20. However, if preferred the hand which grips and moves knob 26 can also hold the glass into which the ice piece is to be dispensed. Alternatively, the knob 26 may be raised by engagement of the rim of a glass. A front flap or deflector 50 directs the piece downwards if necessary.

With this device the ice pieces can be dispensed without being handled.

Figure 5:
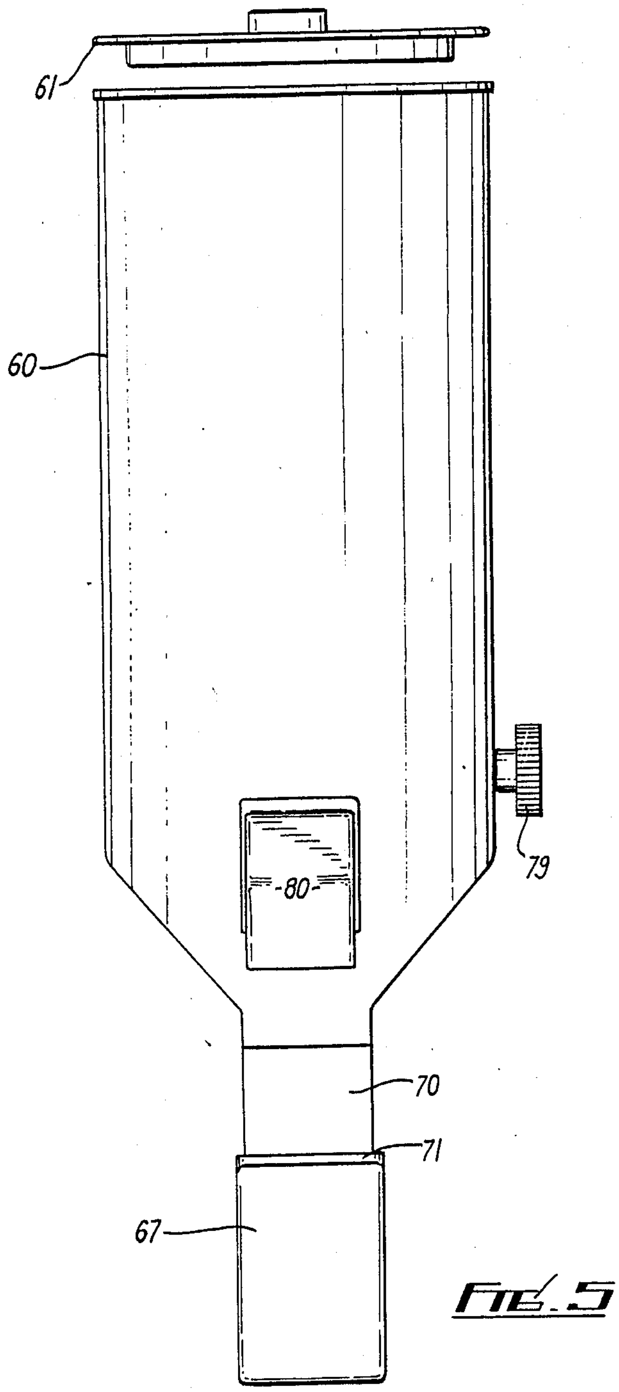
FIG. 5 is a front elevation of the dispenser shown in FIG. 4.

In an alternative embodiment, see now FIGS. 4 to 7, a housing 60 having a lid 61 is formed with a cavity wall 62 to reduce heat losses. Clips 63 serve to mount the housing upon a wall mountable fixing plate 64. The interior of the housing 60 defines a receptacle for pieces of ice. The lower part of the receptacle 65 slopes towards a dispensing structure 66, 67, 69, 71.

The dispensing structure comprises a platform 66 arranged, in its lowermost position, in alignment with the lower surface 65 of the housing. The platform 66 is secured to a rod 69 by which it is guidably supported in an upwardly extending plain bearing 68 for vertical movement relative to a support 70. The support 70 incorporates a drainage tube 72. A cup-shaped actuating member 67, attached to the lower end of rod 69 is slidable relative to support 70 and has a lip 71 which may be engaged by the rim of a user's glass or by a user's hand. In use, the dispensing structure is movable between a first, lower position, as shown in full line, wherein the platform 66 is aligned with the housing surface 65 and a second, upper position shown in chain dot wherein the platform 66' is aligned with an outlet 73. A closure plate 74 integral with the platform 66 masks the outlet 73 when the dispensing structure is in the lower position. A delivery spout 80 is provided in register with outlet 73.

A divider or baffle 76, pivotally secured to the housing, defines a slot 77 between the lower edge of the baffle and the opposed wall of the housing, such slot being dimensioned to allow a single row of pieces of ice to pass to the lower surface 65 and thence to platform 66. A square or otherwise non-circular cross sectioned member 78, rotatable by means of a knob 79 on the exterior of the housing 60 is disposed below the baffle so that the latter rests thereupn. Rotation of the knob 79 causes upward and downward oscillation of the baffle about the pivot axis thereof and thus facilitate passage of pieces of ice to the lower parts of the housing, for example by dislodging any jams which might occur, and the delivery of pieces of ice to the platform 66.

What is claimed is:

1. A dispenser comprising a housing defining a cavity to receive and store a plurality of pieces of ice, an outlet from the cavity, a dispensing structure movable within the cavity between a first location, wherein said dispensing structure communicates with the cavity to receive ice therefrom, and a second location wherein said dispensing structure communicates with the outlet to discharge ice therethrough, movement of the dispensing structure from the first location to the second location causing a piece of ice received in the cavity to be dispensed from the outlet, the first location being lower than the second location, a movable flap disposed within the cavity in closely spaced disposition relative to an opposing housing wall and arranged to provide a gap through which pieces of ice pass sequentially towards the dispensing structure, the cavity having an inclined floor thereto and the said flap being downwardly inclined toward the said floor in opposed relationship with respect to the inclination thereof and the dispensing structure including a platform which, in said first location, is contiguous with said floor, a chute extending downwardly from the housing and on which the dispensing structure is slideably mounted, and manually engageable means cooperatively engaged with the dispensing structure and disposed outwardly of the chute, said manually engageable means serving, upon operation, to move the dispensing structure between said first and second locations, the dispensing structure further including a closure plate positioned for registration with the said outlet when the said structure is in the first location and to provide free access thereto when said structure is displaced from said location.

2. A dispenser as claimed in claim 1, agitating means cooperable with said movable flap and adapted upon actuation to displace said movable flap, said agitating means being in cooperable relationship with the dispensing structure and said movable flap to effect displacement of said movable flap on actuation of said dispensing means. the rod being movable within a plain bearing in the drainage chute, and a manually engageable cup connected to the rod and arranged to slide over the exterior of the drainage chute, movement of the dispensing structure from the first location to the second location causing a piece of ice received by the structure from within the housing to be dispensed from the housing through the outlet.

3. A dispenser as claimed in claim 1, wherein the dispensing structure is arranged, on movement from said first to said second location, to engage the flap to impact movement thereto.

4. A dispenser comprising a housing defining a cavity to receive and store a plurality of pieces of ice, an outlet from the housing, a dispensing structure movable between a first location wherein said structure communicates with the cavity to receive ice therefrom at a position remote from the outlet and a second location wherein said structure communicates with the outlet, and a drainage chute extending from the housing and within which the dispensing structure is guided in moving between the first and second locations, the dispensing structure including a platform, a rod upon which the platform is mounted the rod being movable within a plain bearing in the drainage chute, and a manually engageable cup connected to the rod and arranged to slide over the exterior of the drainage chute, movement of the dispensing structure from the first location to the second location causing a piece of ice received by the structure from within the housing to be dispensed from the housing through the outlet.

5. A dispenser as claimed in claim 4 further including agitating means arranged to agitate pieces of ice in the housing.

6. A dispenser as claimed in claim 4, wherein the cavity has an inclined floor thereto and the dispensing structure includes a platform for engaging and lifting a piece of ice to be dispensed, and for discharging the piece of ice from the outlet when in the second location, the said platform being contiguous with the inclined floor when in the first position of the dispensing structure.

7. A dispenser comprising a housing defining a cavity to receive and store a plurality of pieces of ice, an opening in said housing in communication with said cavity, a dispensing structure movably mounted relative to said housing for movement between first and second positions wherein said structure communicates with the cavity within the housing to take up ice therefrom and with the opening, respectively, a baffle movably mounted within and extending across said cavity, the baffle having an edge arranged in spaced disposition relative to an opposing housing wall, and agitating means cooperable with the baffle and adapted upon actuation to displace said baffle, movement of the dispensing structure from the first to the second position causing a piece of ice received in the dispensing structure in said first position to be dispensed through the outlet, the cavity having an inclined floor thereto and the dispensing structure including a platform which, in the said first position of the structure, is contiguous with said floor, the outlet being disposed at a higher level than said floor and being in horizontal register with the said platform in the second position of the dispensing structure, the housing including a chute in which the dispensing structure is slidably mounted and the dispensing structure including a cup-shaped body disposed outwardly of the chute and slidable thereon.

8. A dispenser comprising a housing defining a cavity for receipt of a plurality of pieces of ice, an outlet from the housing, a dispensing structure movable between a first position wherein said structure communicates with the cavity to receive ice therefrom and a second position wherein said structure communicates with the outlet, and a drainage chute by which the dispensing structure is guided in moving between the first and second positions, the dispensing structure including a platform, a rod upon which the platform is mounted, the rod being movable axially of the drainage chute, and a manually engageable means operatively connected with the rod and extending from the chute, the said manually engageable means including a cup-shaped member slideably mounted coaxially with the chute and arranged outwardly thereof and being adapted and arranged upon manual displacement in an appropriate sense to move the dispensing structure between the said first and second positions, movement of the dispensing structure from the first position to the second position causing a piece of ice received from the cavity to be dispensed from the outlet.

9. A dispenser as claimed in claim 8, wherein the cavity has an inclined floor thereto and the platform of the dispensing structure, in the said first position of the said dispensing structure, is contiguous with said floor, the outlet in the housing being disposed at a higher level than said floor and being in horizontal register with the said platform in the second position of the dispensing structure.

* * * * *

UNITED STATES PATENT AND TRADEMARK OFFICE

CERTIFICATE OF CORRECTION

PATENT NO. : 4,913,315

DATED : April 3, 1990

INVENTOR(S) : Malcolm I. Wagner

It is certified that error appears in the above-identified patent and that said Letters Patent is hereby corrected as shown below:

Column 4, lines 11-18, delete all the words after the "." starting with "the rod ... the outlet."

Signed and Sealed this

Seventh Day of May, 1991

*Attest:*

HARRY F. MANBECK, JR.

*Attesting Officer*

*Commissioner of Patents and Trademarks*